Feb. 26, 1957 J. W. RAYMOND 2,782,551
ATTACHMENT FOR FISHHOOKS
Filed April 7, 1953

INVENTOR.
Jerry W. Raymond.
BY
ATTORNEYS.

United States Patent Office 2,782,551
Patented Feb. 26, 1957

2,782,551

ATTACHMENT FOR FISHHOOKS

Jerry W. Raymond, Wenatchee, Wash.

Application April 7, 1953, Serial No. 347,340

1 Claim. (Cl. 43—44.82)

This invention relates to fishing tackle and has special reference to a fish hook attachment.

More particularly, the invention relates to an improvement on my Patent No. 2,632,278, issued March 24, 1953.

One important object of the invention is to provide means for securing the shank of the fish hook attachment in such manner to the shank of main hook that the bills of said hooks lie substantially at right angles to each other.

A second important object of the invention is to provide an improved means for securing the shanks so that portions of the two shanks will lie in parallel relation.

A third important object of the invention is to provide a novel clip for securing these shanks in such parallel manner.

A fourth important object of the invention is to provide novel means for securing the hooks in position when carried by the clip and to prevent turning.

The invention consists in general of certain novel details of construction and combinations of parts hereinafter fully described, illustrated in the accompanying drawings and particularly claimed.

In the accompanying drawings, like characters of reference indicate like parts, and Fig. 1 is a side elevation of my finished device.

Figure 1:
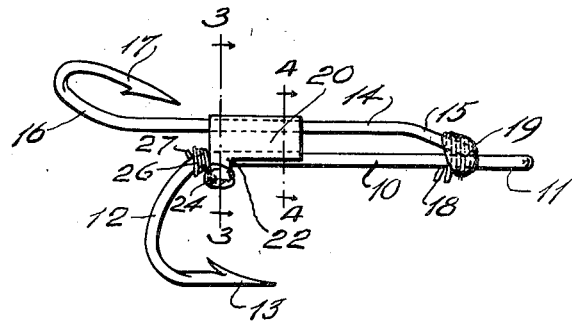
Figure 2:
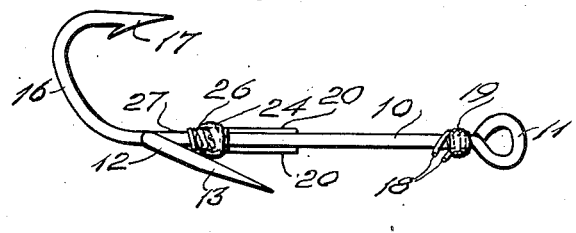
Fig. 2 is a top plan view of the device as shown in Fig. 1.

One of these hooks is adapted for connection to a fish line and to that end, it is provided with a straight shank portion 10, having an eye or other aligned attaching means as at 11. At the end opposite the eye, the shank is provided with a bill 12 terminating in a sharp barb 13.

The other hook is provided with a shank having a linear portion 14 and an angularly bent end 15, which rests on the shank 10 in spaced relation to the eye 11. The shank 14 terminates forwardly in a bill 16 terminating in a sharp barb 17.

In order to secure the shank portion 15 on shank 11, wire 18 is wound around the two portions at their contacting parts and a soldering 19 is provided to cover and hold the wires in position.

Figure 3:
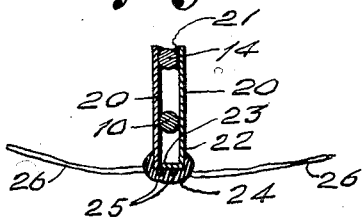
Fig. 3 is a section on the line 3—3 of Fig. 1.
Figure 4:
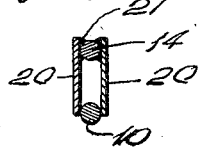
Fig. 4 is a section on the line 4—4 of Fig. 1.

A clip is used in connection with the hook attachment and this clip has flat side members 20, which lie on opposite sides of the shank portion 14 and is soldered thereto as indicated at 21. The sides 20 are of rectangular form but at the end of the clip remote from the eye 11 these sides are extended downwardly as at 22 to form a stirrup at the bottom as shown best in Fig. 3 at 23. The shank 10 is held between these sides at the upper part of the stirrup and the lower end of the stirrup is provided with a boss 24 of solder, wherein are anchored wires 25 having ends 26 which project for a considerable distance from the boss 24 and which, when the device is assembled, are wrapped around the shank 10 as shown best in Fig. 1, at 27.

By means of this arrangement, the bills of the hooks are assembled in planes substantially at right angles to each other and are there securely held.

There has thus been provided a simple and efficient device of the kind described and for the purpose specified. It is obvious that changes may be made in the form and construction of this invention without departing from the material principles thereof. It is not therefore desired to confine the invention to the exact form shown and described, but it is wished to include all such as come within the scope claimed.

In the terminating claim that follows, the hook that is equipped for attachment to a fish line, will be referred to as a "standard hook," the other as the "auxiliary hook."

What is claimed as new is:

An attachment for a standard fish hook which hook has a straight shank formed at one end with an eye for its attachment to a fishing line and formed at its other end into a bill; said attachment comprising an auxiliary fish hook having a shank formed at one end with a bill and having a terminating portion at its other end directed laterally relative to the plane of its bill portion, a tie wire soldered between its ends to said laterally directed portion of said shank, and a clip formed from a flat piece of metal bent to U-form and applied to the shank of the said auxiliary hook near its bill portion, with the free edge portions thereof containing the auxiliary hook shank therebetween and soldered thereto and with the closed end of the U-shaped portion spaced from the shank, and a tie wire soldered between its ends to the U-shaped seat of said clip, said wire being wrapped about the standard fish hook bill to hold the same in position between the sides of the said clip, and the shank thereof maintained in a position extended along the shank of the auxiliary hook, the end of the laterally directed portion of the auxiliary hook shank engaging the standard hook shank at a point adjacent the eye thereof, and said first mentioned tie wire being wrapped about the adjacent portions of the shank of the standard hook thus joining the hooks together.

References Cited in the file of this patent

UNITED STATES PATENTS

| 986,747 | Olson | Mar. 14, 1911 |
| 989,392 | Mueller | Apr. 11, 1911 |
| 2,280,197 | Ounsworth | Apr. 21, 1942 |
| 2,333,503 | Worden | Nov. 2, 1943 |
| 2,514,527 | Verhota | July 11, 1950 |
| 2,632,278 | Raymond | Mar. 24, 1953 |